US011360921B2

United States Patent
Wang et al.

(10) Patent No.: US 11,360,921 B2
(45) Date of Patent: Jun. 14, 2022

(54) SYSTEM AND METHOD OF INTERFACE COMMUNICATION COMPATIBLE WITH SFP+ OPTICAL MODULE AND QSFP+ SWITCH

(71) Applicant: Linktel Technologies Co., Ltd., Wuhan (CN)

(72) Inventors: Bing Wang, Wuhan (CN); Linke Li, Wuhan (CN); Tianshu Wu, Wuhan (CN); Xianwen Yang, Wuhan (CN); Jian Zhang, Wuhan (CN)

(73) Assignee: LINKTEL TECHNOLOGIES CO., LTD., Wuhan (CN)

( * ) Notice: Subject to any disclaimer, the term of this patent is extended or adjusted under 35 U.S.C. 154(b) by 0 days.

(21) Appl. No.: 17/447,414

(22) Filed: Sep. 10, 2021

(65) Prior Publication Data

US 2022/0092012 A1    Mar. 24, 2022

(30) Foreign Application Priority Data

Sep. 21, 2020    (CN) .......................... 202010991671.4

(51) Int. Cl.
*G06F 13/40*    (2006.01)
*G06F 13/42*    (2006.01)
(Continued)

(52) U.S. Cl.
CPC ...... *G06F 13/4022* (2013.01); *G06F 13/4063* (2013.01); *G06F 13/4282* (2013.01);
(Continued)

(58) Field of Classification Search
CPC ............ G06F 13/4022; G06F 13/4063; G06F 13/4282; H04B 10/40; H04L 69/08; H04Q 11/0003; H04Q 11/0005
See application file for complete search history.

(56) References Cited

U.S. PATENT DOCUMENTS 10,444,453 B1 *  10/2019  Khamaisee .......... H04B 10/801
2012/0233368 A1 *   9/2012  Alshinnawi .......... G06F 13/128
                                                        710/301
(Continued)

FOREIGN PATENT DOCUMENTS

CN       105740184 A       7/2016
CN       107370750 A      11/2017
(Continued)

OTHER PUBLICATIONS

SNIA, "SFF-8679 QSFP+ 4X Hardware and Electrical Specification", Oct. 4, 2018, Revision 1.8 (Year: 2018).*

*Primary Examiner* — Phong H Dang
(74) *Attorney, Agent, or Firm* — Bayramoglu Law Offices LLC

(57) ABSTRACT

A system and a method of interface communication being compatible with SFP+ optical modules and QSFP+ switch are provided. The system includes an adapter card. The adapter card includes a set of SFP+ golden fingers that comply with the SFP+ protocol, a set of QSFP+ golden fingers that comply with the QSFP+ protocol, and a microcontroller unit. The adapter card communicates with the SFP optical module through the SFP+ golden fingers, and communicates with the QSFP switch through the QSFP+ golden fingers. The microcontroller unit is used to extend and process the pin information in the adapter card, and to convert the two different protocols of SFP+ and QSFP+, so that the module under the SFP+ protocol can respond under the port of QSFP+, so as to realize the data communication between the SFP+ optical module and the QSFP+ switch.

8 Claims, 5 Drawing Sheets

(51) Int. Cl.
  *H04B 10/40* (2013.01)
  *H04L 69/08* (2022.01)
  *H04Q 11/00* (2006.01)

(52) U.S. Cl.
  CPC ............. *H04B 10/40* (2013.01); *H04L 69/08* (2013.01); *H04Q 11/0003* (2013.01); *H04Q 11/0005* (2013.01); *G06F 2213/0016* (2013.01)

(56) References Cited

U.S. PATENT DOCUMENTS

| | | | | |
|---|---|---|---|---|
| 2012/0251124 | A1* | 10/2012 | Lewis | H04L 12/6418 |
| | | | | 398/135 |
| 2013/0272348 | A1* | 10/2013 | Lai | G02B 6/4246 |
| | | | | 375/219 |
| 2014/0248059 | A1* | 9/2014 | Tang | H04L 49/352 |
| | | | | 398/136 |
| 2015/0104169 | A1* | 4/2015 | Tang | H04B 10/40 |
| | | | | 398/45 |
| 2018/0306989 | A1 | 10/2018 | Khazen et al. | |
| 2019/0147202 | A1* | 5/2019 | Harney | H04L 41/0809 |
| | | | | 235/375 |

FOREIGN PATENT DOCUMENTS

| | | |
|---|---|---|
| CN | 107707362 A | 2/2018 |
| CN | 107729220 A | 2/2018 |
| CN | 108363577 A | 8/2018 |
| CN | 208001282 U | 10/2018 |
| CN | 210807332 U | 6/2020 |

\* cited by examiner

SYSTEM AND METHOD OF INTERFACE COMMUNICATION COMPATIBLE WITH SFP+ OPTICAL MODULE AND QSFP+ SWITCH

CROSS REFERENCE TO THE RELATED APPLICATIONS

This application is based upon and claims priority to Chinese Patent Application No. 202010991671.4, filed on Sep. 21, 2020, the entire contents of which are incorporated herein by reference.

TECHNICAL FIELD

The present invention relates to the optical communication technology field, specifically, to system and method of interface communication compatible with Small Form-factor Pluggables+ (SFP+) optical module and Quad Small Form-factor Pluggable+ (QSFP+) switch.

BACKGROUND

In the communication network, the optical module at the physical layer greatly limits the transmission rate of the communication network. In the optical module industry, in order to improve the compatibility of optical modules, the Storage Networking Industry Association has formulated a unified standard for the optical module industry, however, with demand for continuous increase in communication speed, optical modules have derived different packages for four-channel and single-channel. For switches, modules with different packages cannot be used, which greatly limits the practicability of optical modules.

In order to solve the practicality of optical modules and reduce unnecessary switch purchase expenses, the existing packaging mode needs to be backward compatible, that is, 10 Gbps/25 Gbps SFP+ optical modules can also meet the needs of 40 Gbps/100 Gbps QSFP+ switches.

The existing adapter card can only complete the conversion and intervention of high-speed signals, and cannot be fully compatible with the conversion of the reported amount and various control signals, so certain improvements are needed on the adapter card.

SUMMARY

In view of the technical shortcomings and technical disadvantages in the prior art, the embodiments of the present invention provide a system and method of interface communication compatible with SFP+ optical module and QSFP+ switch that overcome the above problems or at least partially solve the above problems, the specific solutions are as follows:

A system of interface communication compatible with SFP+ optical modules and QSFP+ switch, including: adapter card, the adapter card includes a set of SFP+ golden fingers that comply with the SFP+ protocol, a set of QSFP+ golden fingers that comply with the QSFP+ protocol, and a microcontroller unit (MCU); the adapter card communicates with the SFP optical module through the SFP+ golden fingers, and communicates with the QSFP switch through the QSFP+ golden fingers; the microcontroller unit is used to extend and process the pin information in the adapter card, and to convert the two different protocols of SFP+ and QSFP+, so that the module under the SFP+ protocol can respond under the port of QSFP+, so as to realize the data communication between the SFP+ optical module and the QSFP+ switch.

Further, the QSFP+ golden finger includes four sets of high-speed signal pins and five sets of control signal pins; the four sets of high-speed signal pins are Tx1/Rx1 pins, Tx2/Rx2 pins, Tx3/Rx3 pins, and Tx4/Rx4 pins; the five sets of control signal pins are ModSelL pins, ResetL pins, LPMode pins, IntL pins and ModePrsL pins;

the SFP+ golden finger includes a set of high-speed signal pins and four sets of control signal pins; a set of high-speed signal pins are Tx1/Rx1 pins, and the four sets of control signal pins are ModePrsL pins, RS0&RS1 pins, TXDISABLE pins and LOS pins;

the microcontroller unit includes two Inter-Integrated Circuit bus (IICs), namely I2C_1 and I2C_2; the microcontroller unit communicates with the QSFP switch connected to the QSFP+ golden finger through I2C_2, and communicates with the SFP optical module connected to the SFP+ golden finger through the I2C_1 of the golden finger; the microcontroller unit also communicates with the mounted Electrically Erasable Programmable Read Only Memory (EEPROM) through the IIC/Serial Peripheral Interface (SPI) communication mode;

the Tx1/Rx1 pin of the QSFP+ golden finger is directly connected with the Tx1/Rx1 pin of the SFP+ golden finger, and the other three high-speed signal pins of the QSFP+ golden finger are shielded, so that the signals transmitted by the QSFP+ golden finger are only guaranteed one channel of signal communicates with the module of the SFP+ golden finger; the ModSelL of the QSFP+ golden finger is connected with the microcontroller unit to detect whether the communication between the QSFP+ golden finger and the microcontroller unit is established; the ModePrsL pin of the QSFP+ golden finger and the ModePrsL pin of the SFP+ golden finger are both connected with the microcontroller unit, used to detect whether the SFP+ optical module connected with the SFP+ golden finger is inserted; the LPMode pin of the QSFP+ golden finger is the low-power control pin of the QSFP+ golden finger, which is directly connected with the microcontroller unit, and is connected with the RS0&RS1 of the SFP+ golden finger through level conversion logic, and it shows the function of rate selection at the SFP+ optical module side; the ResetL pin of the QSFP+ golden finger has the module reset function, it's directly connected with the microcontroller unit, and connected with the TXDISABLE pin of the SFP+ golden finger through the level conversion logic, and it shows the function of TxDisable at the SFP+ optical module side; the IntL pin of the QSFP+ golden finger has the interrupt output function, it's directly connected with the microcontroller unit, and connected with the Loss Of Signal (LOS) of the SFP+ golden finger through the level conversion logic, and it shows the LOS function at the SFP+ module side.

Further, the microcontroller unit is used to extend and process the pin information in the adapter card, and converts the two different protocols of SFP+ and QSFP+, so that the module under the SFP+ protocol can respond under the port of QSFP+, including: realize software-level memory mapping compatibility and protocol conversion logic in the microcontroller unit;

wherein, realize software-level memory mapping compatibility is specifically as follows: divide two Static Random-Access Memory (SRAM) areas in the microcontroller unit, namely SFP+SRAM area and QSFP+SRAM area; the SFP+SRAM area corresponds to the SFP+ optical module, and the QSFP+SRAM area corresponds to the QSFP+ switch; the SFP+SRAM area is allocated with protocol definition storage space A0 and A2, which are used to store various code-writing information and reporting information of the SFP+ optical module, and the QSFP+SRAM area is allocated with protocol definition storage space A0;

the protocol conversion logic is specifically as follows: when the SFP+ module is connected with the adapter card, the microcontroller unit reads various code-writing information and reporting information of the SFP+ optical module, and stores them in the A0 address and A2 address of the SFP+SRAM area; in the internal program processing of the microcontroller unit, when the microcontroller unit of the adapter card responds to the read-write command sent by the QSFP+ switch, the information in A0 address and A2 address of the SFP+SRAM area is converted into the information that conforms to the QSFP+ protocol and stored in the A0 address of the QSFP+SRAM area. Subsequently, the port of the QSFP+ switch will send the read/write command of the A0 address. When the microcontroller unit recognizes this signal, it will point the pointer to the corresponding position in the QSFP+SRAM area to query related information and return it to the QSFP+ switch.

Further, the A0 address of the SFP+ SRAM area includes 256 byte spaces, wherein the 0-127 byte spaces are defined as A0 LOW, used to store the module identification information and the manufacturer information of the SFP+ optical module, and the 128-255 byte spaces are defined as A0 HIGH, used to store the module identification information of the SFP+ optical module; the A2 address of the SFP+ SRAM area includes 256 byte spaces, wherein the 0-127 byte spaces are defined as A2 LOW, used to store the threshold information, the quantity of control signal and the reporting information of the SFP+ optical module, the 128-255 byte spaces are defined as A2 HIGH, used to store user-defined information of the SFP+ optical module; the A0 address of the QSFP+SRAM area includes 256 byte spaces, among which, 0-127 byte spaces are defined as A0 LOW, and the 128-255 byte spaces are defined as A0 HIGH, wherein the A0 HIGH includes four address spaces, namely 00h, 01h, 02h and 03; convert the information in the A0 and A2 addresses of the SFP+ SRAM area into the information that conforms to the QSFP+ protocol and store it in the A0 address of the SFP+ SRAM area is specifically as follows:

the module identification information and the manufacturer information in the A0 LOW address of the SFP+SRAM area are divided into two parts, one part includes the module identification information and the manufacturer information, which are converted into information that conforms to the QSFP+ protocol and stored in A0 LOW of the QSFP+SRAM area, the other part includes module identification information, which is converted into information that conforms to the QSFP+ protocol and stored in the 00h address of the A0 HIGH of the QSFP+ SRAM area;

the module identification information in the A0 HIGH address of the SFP+SRAM area is converted into information that conforms to the QSFP+ protocol and stored in 00h and 01h of the A0 HIGH of the QSFP+ SRAM;

the threshold information, the quantity of control signal and the reporting information in the A2 LOW address of the SFP+SRAM area are divided into two parts; one part includes the quantity of control signal and the reporting information, which are converted into information that conforms to the QSFP+ protocol, and stored in A0 LOW of the QSFP+SRAM area, the other part includes threshold information, which is converted into information that conforms to the QSFP+ protocol and stored in the 03h address of the A0 HIGH of the QSFP+SRAM area;

the user-defined information in the A2 HIGH address of the SFP+SRAM area is converted to the information that conforms to the QSFP+ protocol and stored in 02h of the A0 HIGH of the QSFP+SRAM.

Further, the microcontroller unit is also connected with EEPROM, and the EEPROM is used to store customized code-writing information of the SFP+ optical module.

Further, the protocol conversion logic also includes: when the SFP+ module is connected with the adapter card, the microcontroller unit reads the customized code-writing information of the SFP+ optical module and writes it into the EEPROM, and according to the requirements, the customized code-writing information in the EEPROM is stored in the A0 LOW address of the QSFP+SRAM area and the four address spaces of 00h, 01h, 02h and 03h of the A0 HIGH.

Further, in order for the QSFP+ switch to correctly identify the SFP+ optical module information, two steps are required, specifically as follows: when the SFP+ module is connected with the adapter card, the microcontroller unit reads the identification information of the SFP+ optical module and stores it in the SFP+ SRAM area; when the microcontroller unit of the adapter card responds to the read-write commands sent by the QSFP+ switch, it converts the identification information in the internal SFP+SRAM area into the information that conforms to the QSFP+ protocol and stores it in the A0 address of the SFP+SRAM area, and then, returns it to the QSFP+ switch in accordance with the QSFP+ protocol format, so as to ensure that the SFP+ optical module can be identified by the QSFP+ switch.

Another purpose of the present invention is to provide a method of interface communication compatible with SFP+ optical module and QSFP+ switch, including:

an adapter card is set between the SFP+ optical module and the QSFP+ switch, the adapter card includes a set of SFP+ golden fingers that comply with the SFP+ protocol, a set of QSFP+ golden fingers that comply with the QSFP+ protocol, and a microcontroller unit; the adapter card communicates with the SFP optical module through the SFP+ golden fingers, and communicates with the QSFP switch through the QSFP+ golden fingers;

extend and process the pin information in the adapter card through the microcontroller unit, and convert the two different protocols, SFP+ and QSFP+, so that the module under the SFP+ protocol can respond under the port of QSFP+, so as to realize the data communication between the SFP+ optical module and the QSFP+ switch;

wherein, extends and processes the pin information in the adapter card through the microcontroller unit, and converts the two different protocols of SFP+ and QSFP+, so that the module under the SFP+ protocol can respond under the port of QSFP+, including: realize software-level memory mapping compatibility and protocol conversion logic in the microcontroller unit;

wherein, realize memory mapping compatibility is specifically as follows: divide two SRAM areas in the microcontroller unit, namely SFP+SRAM area and QSFP+SRAM area, the SFP+SRAM area corresponds to the SFP+ optical module, and the QSFP+SRAM area corresponds to the QSFP+ switch, the SFP+SRAM area is allocated with protocol definition storage space A0 and A2, which are used to store various code-writing information and reporting information of the SFP+ optical module, and the QSFP+SRAM area is allocated with protocol definition storage space A0;

the A0 address of the SFP+ SRAM area includes 256 byte spaces, wherein the 0-127 byte spaces are defined as A0 LOW, used to store the module identification information and manufacturer information of the SFP+ optical module, and the 128-255 byte spaces are defined as A0 HIGH, used to store the module identification information of the SFP+ optical module; the A2 address of the SFP+ SRAM area includes 256 byte spaces, wherein the 0-127 byte spaces are defined as A2 LOW, used to store the threshold information, the quantity of control signal and the reporting information of the SFP+ optical module, the 128-255 byte spaces are defined as A2 HIGH, used to store user-defined information of the SFP+ optical module;

the A0 address of the QSFP+SRAM area includes 256 byte spaces, among which, 0-127 byte spaces are defined as A0 LOW, and the 128-255 byte spaces are defined as A0 HIGH, where in the A0 HIGH includes four address spaces, namely 00h, 01h, 02h and 03h;

the protocol conversion logic is specifically as follows: when the SFP+ module is connected to the adapter card, the microcontroller unit reads various code writing information and reporting information of the SFP+ optical module, and stores them in the A0 address and A2 address of the SFP+SRAM area, in the internal program processing of the microcontroller unit, when the microcontroller unit of the adapter card responds to the read-write command sent by the QSFP+ switch, the information in A0 address and A2 address of the SFP+SRAM area is converted into the information conforming to the QSFP+ protocol and stored in the A0 address of the QSFP+SRAM area.

Further, the microcontroller unit is also connected with EEPROM, and the EEPROM is used to store customized code writing information of the SFP+ optical module; the protocol conversion logic also includes: when the SFP+ module is connected to the adapter card, the microcontroller unit reads the customized code writing information of the SFP+ optical module and writes it into the EEPROM, and according to the requirements, the customized code-writing information in the EEPROM is stored in the A0 LOW address of the QSFP+SRAM area and the four address spaces of 00h, 01h, 02h and 03h of the A0 HIGH.

The present invention has the following beneficial effects:

The embodiment of the present invention discloses a system and method of interface communication compatible with SFP+ optical module and QSFP+ switch, the microcontroller unit extends and processes the pin information in the adapter card, and converts the two different protocols of SFP+ and QSFP+, so that the module under the SFP+ protocol can respond under the port of QSFP+ to realize the data communication between the SFP+ optical module and the QSFP+ switch, on the premise of fully meeting the high-speed signal transmission, at the same time, the introduction of the microcontroller unit can be compatible with the reported information and control signals. In addition, the EEPROM can be expanded to store the required information to solve the problems described in the background art.

DETAILED DESCRIPTION OF THE EMBODIMENTS

The technical scheme in the embodiments of the present invention will be clearly and completely described below in combination with the accompanying drawings in the embodiments of the present invention. Obviously, the described embodiments are only a part of the present invention, not all of the embodiments. Based on the embodiments of the present invention, all other embodiments obtained by one of ordinary skill in the art without creative work shall fall within the protection scope of the present invention.

Figure 1:
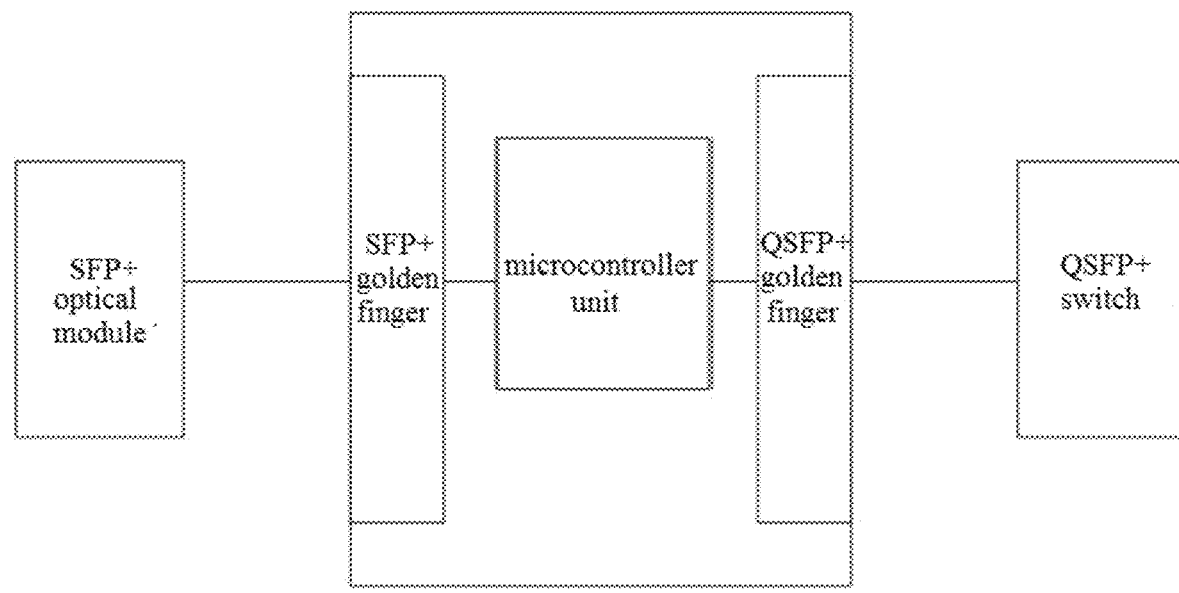
FIG. 1 shows the structure of the system of interface communication compatible with SFP+ optical module and QSFP+ switch provided by the embodiment of the present invention.

Generally, the supportable interfaces of switches can be roughly divided into three package types: SFP+, QSFP+ and XFP (10 Gigabit Small Form Factor Pluggable). The present invention currently supports the module communication conversion between SFP+ and QSFP+. In order to further explain the technical solution of the present invention, the differences between the two package types are discussed here. As shown in the FIG. 1, it's the system of interface communication compatible with SFP+ optical module and QSFP+ switch provided by the embodiment of the present invention, including: adapter card, the adapter card includes a set of SFP+ golden fingers that comply with the SFP+ protocol, a set of QSFP+ golden fingers that comply with the QSFP+ protocol, and a microcontroller unit; the adapter card communicates with the SFP optical module through the SFP+ golden fingers, and communicates with the QSFP switch through the QSFP+ golden fingers; the microcontroller unit is used to extend and process the pin information in the adapter card, and to convert the two different protocols of SFP+ and QSFP+, so that the module under the SFP+ protocol can respond under the port of QSFP+, so as to realize the data communication between the SFP+ optical module and the QSFP+ switch.

Figure 2A:
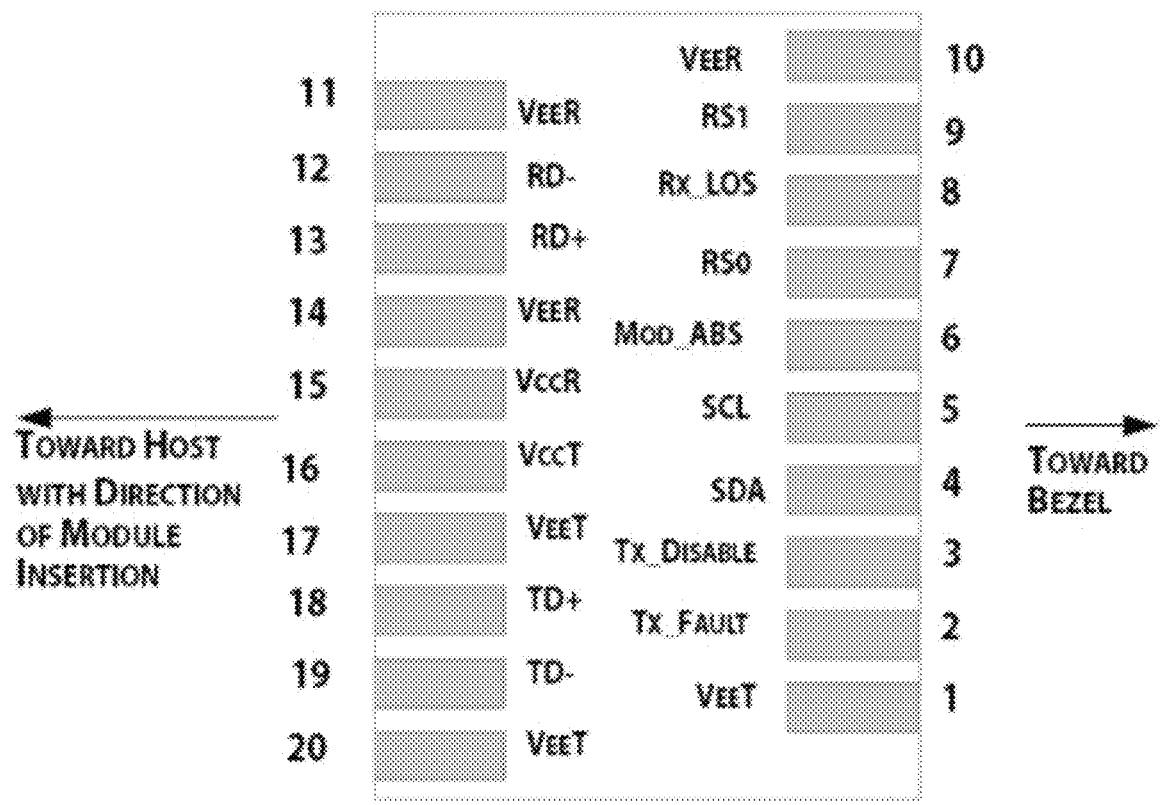
FIG. 2A shows the schematic diagram of the pin definition of the SFP+ golden finger provided by the embodiment of the present invention.
Figure 2B:
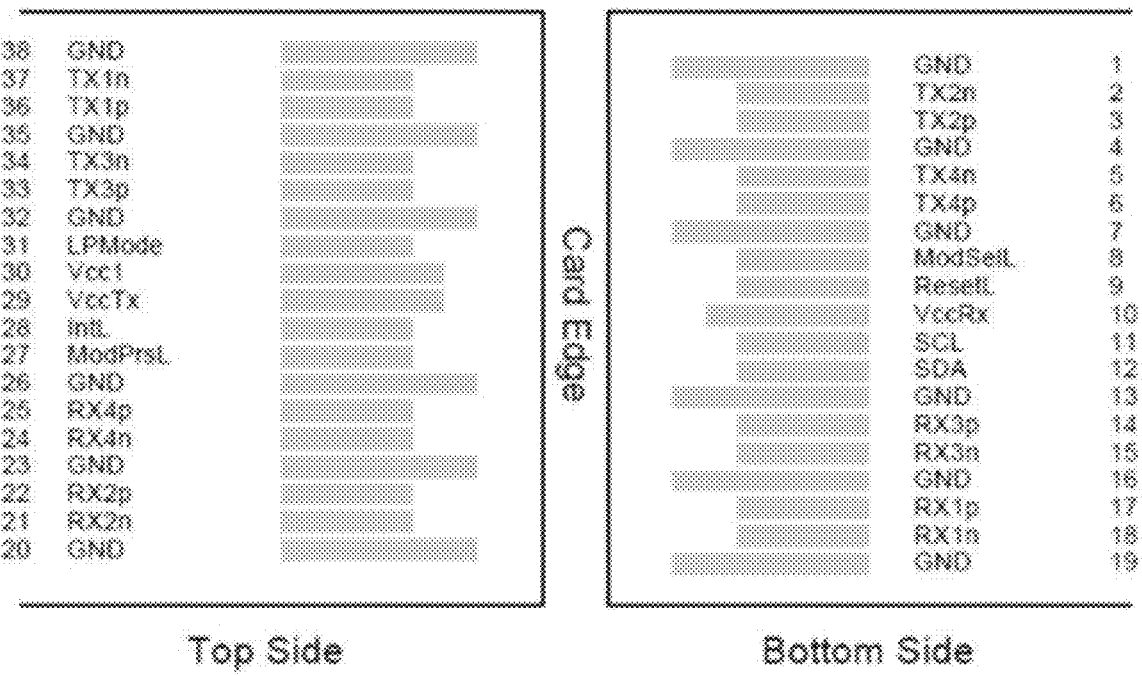
FIG. 2B shows the schematic diagram of the pin definition of the QSFP+ golden finger provided by the embodiment of the present invention.

FIG. 2A and FIG. 2B are the schematic diagrams of golden finger packaging. As shown in the FIG. 2A, there are 20 sets of golden fingers for the SFP+ package module. But as shown in the FIG. 2B, QSFP+ has sets of 38 golden fingers, therefore, in terms of the pin definitions, the two package modules cannot be compatible, and a conversion needs to be made on the physical pins. In the QSFP+ package shown in FIG. 2B, 4 sets of high-speed signals (TxRx) and 5 sets of control signals (ModSelL, ResetL, LPMode, IntL, ModePrsL) are integrated, which is different from the SFP+ package shown in FIG. 2A, but the 5 control signals are basically the same in function, and can be compatible through certain conversions.

Figure 3:
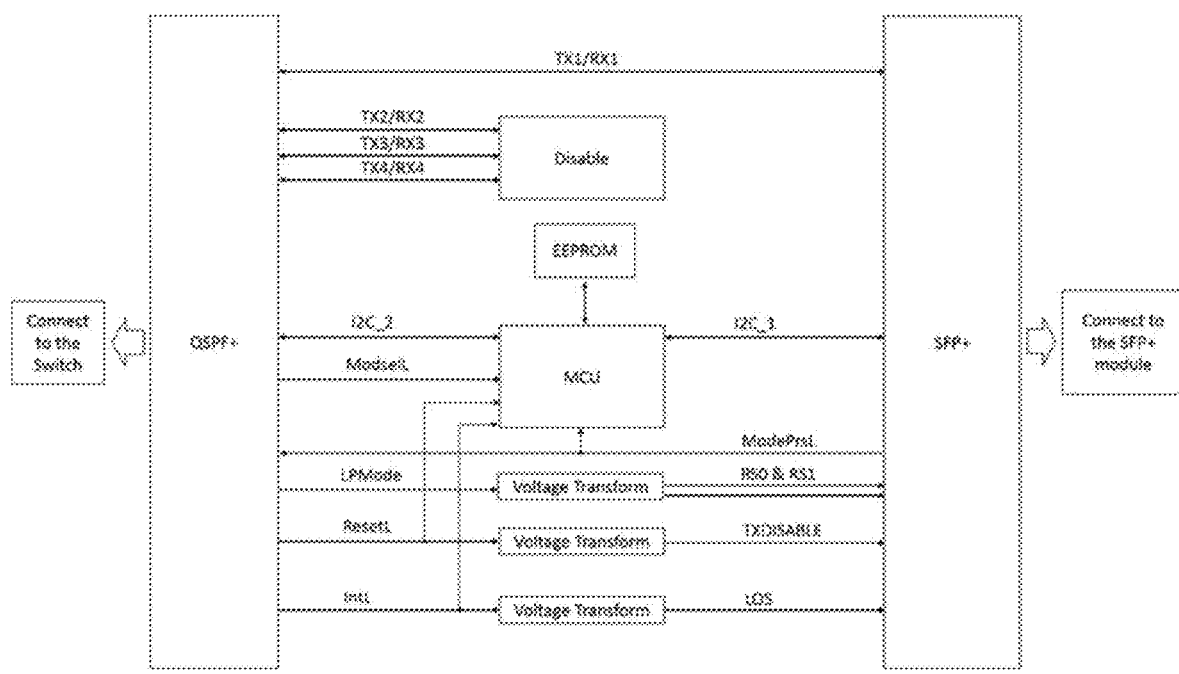
FIG. 3 shows the connection diagram of the adapter card that provided by the embodiment of the present invention.

As shown in the FIG. 3, it's the connection diagram of the adapter card, in this embodiment, there are two golden fingers used for communication, the QSFP+ golden finger port on the left side is used to connect the switch, and the SFP+ golden finger on the right side is used to connect the SFP+ optical module, they can fully meet the needs of use on the interface. In the processing of high-speed signals, shield the 3 signals transmitted from the QSFP+ port, and only guaranteed one channel of signal communicates with the module of the SFP+ golden finger. For example, the 40 Gbps QSFP+ package is the coupling of 4 channels of 10 Gbps SFP+ packages. The reason for using this method is to make the SFP+ module work on the 40 Gbps port, so it is necessary to reduce 3 high-speed signals. In addition, the microcontroller unit includes 2 IICs: one communicates with the switch of the QSFP+ port, and the other communicates with the optical module of the SFP+ port. For the connected EEPROM, the microcontroller unit can communicate with EEPROM through serial communication protocol (IIC or SPI). It should be noted that, in this embodiment, in addition to the connection with the microcontroller unit, the control signal is also directly connected to the golden finger of the SFP+ through the voltage conversion logic circuit.

Wherein, the ModSelL of the QSFP+ golden finger is connected with the microcontroller unit to detect whether the communication between the QSFP+ golden finger and the microcontroller unit is established; the ModePrsL pin of the QSFP+ golden finger and the ModePrsL pin of the SFP+ golden finger are both connected with the microcontroller unit, used to detect whether the SFP+ optical module connected with the SFP+ golden finger is inserted; the LPMode pin of the QSFP+ golden finger is the low-power control pin of the QSFP+ golden finger, which is directly connected with the microcontroller unit, and is connected with the RS0&RS1 of the SFP+ golden finger through level conversion logic, and it shows the function of rate selection at the SFP+ optical module side; the ResetL pin of the QSFP+ golden finger has the module reset function, it's directly connected with the microcontroller unit, and connected with the TXDISABLE pin of the SFP+ golden finger through the level conversion logic, and it shows the function of TxDisable at the SFP+ optical module side; the IntL pin of the QSFP+ golden finger has the interrupt output function, it's directly connected with the microcontroller unit, and connected with the LOS of the SFP+ golden finger through the level conversion logic, and it shows the LOS function at the SFP+ module side.

The microcontroller unit is used to extend and process the pin information in the adapter card, and converts the two different protocols of SFP+ and QSFP+, so that the module under the SFP+ protocol can respond under the port of QSFP+, including: realize software-level memory mapping compatibility and protocol conversion logic in the microcontroller unit.

Figure 4A:
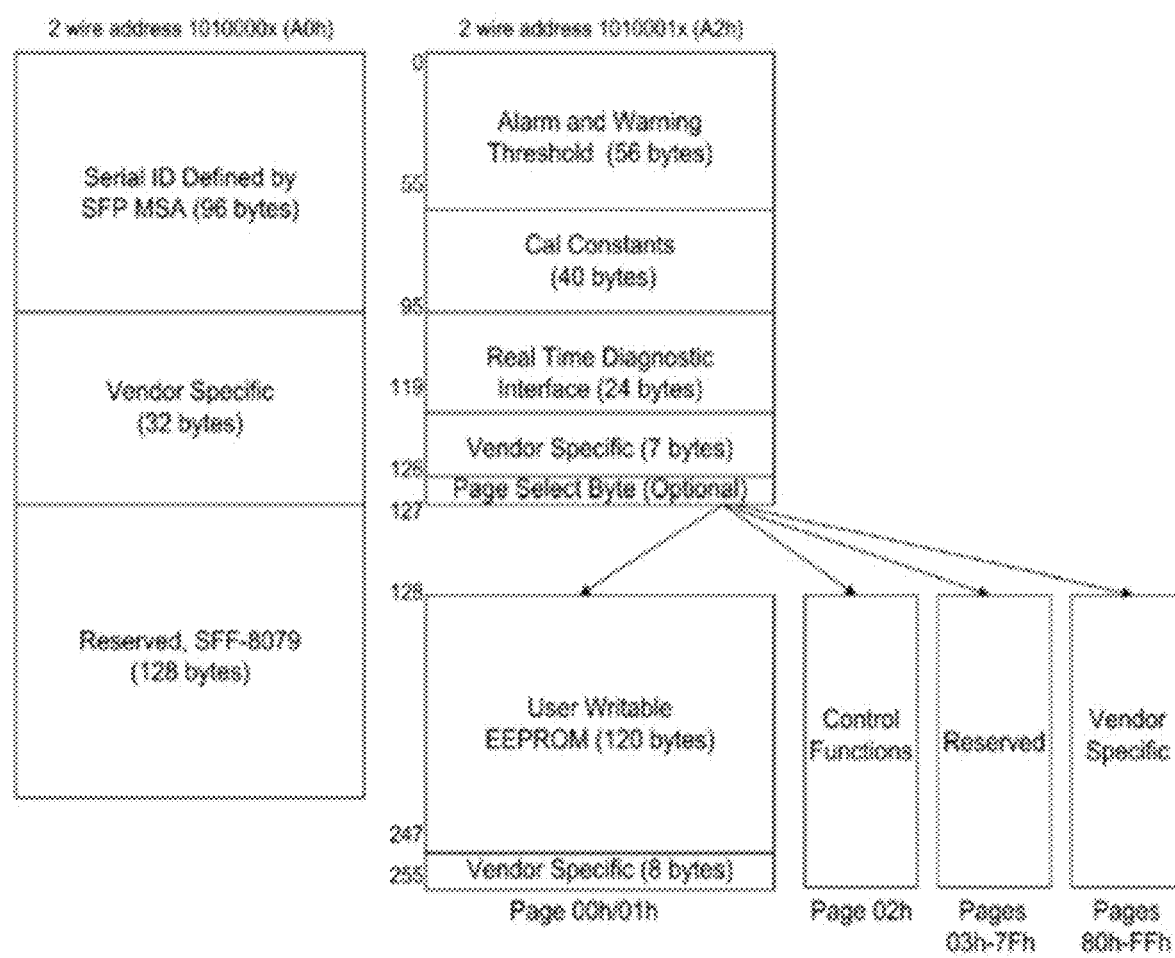
FIG. 4A shows the schematic diagram of the allocation of SFP+SRAM protocol definition storage space provided by the embodiment of the present invention.
Figure 4B:
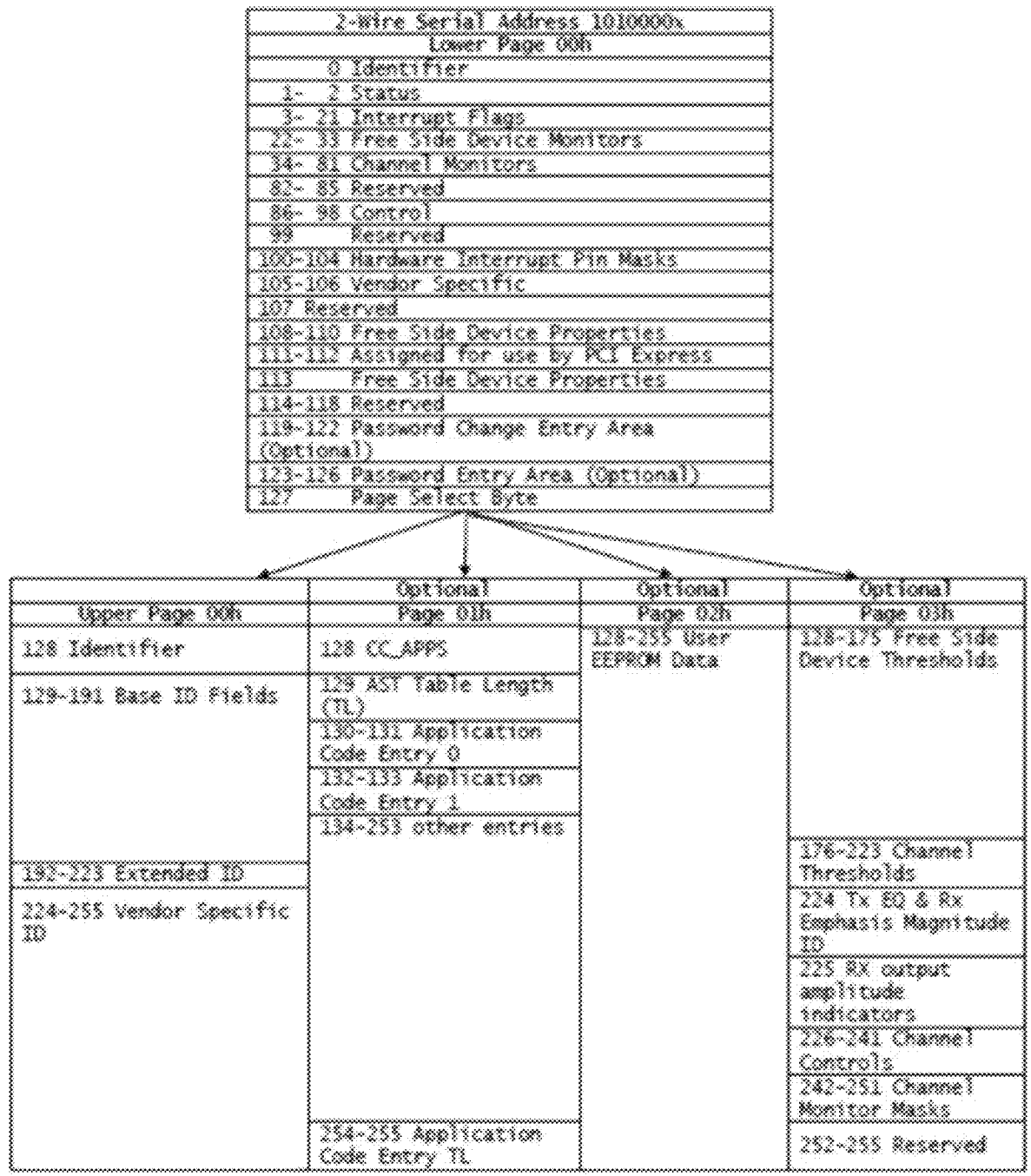
FIG. 4B shows the schematic diagram of the allocation of QSFP+SRAM protocol definition storage space provided by the embodiment of the present invention.

In order to realize the above-mentioned examples of the invention, the present invention realizes the software-level memory mapping compatibility through the microcontroller unit under the above-mentioned existing connection scheme, specifically, divide two SRAM areas in the microcontroller unit, namely SFP+SRAM area and QSFP+SRAM area; the SFP+SRAM area corresponds to the SFP+ optical module, and the QSFP+SRAM area corresponds to the QSFP+ switch; the SFP+SRAM area is allocated with protocol definition storage space A0 and A2, which are used to store various code-writing information and reporting information of the SFP+ optical module, and the QSFP+SRAM area is allocated with protocol definition storage space A0. Among them, A0 and A2 are hexadecimal addresses 0xA0 0xA2. In the protocol conversion logic shown in FIG. 5, in the present invention, a microcontroller unit is added to the adapter card innovatively. The overall idea of protocol conversion is shown in FIGS. 4A and 4B, when the SFP+ optical module is connected to the adapter card (under power-on by default), the microcontroller unit will first read all kinds of code-writing information and reporting information of the currently inserted SFP+ module through the A0 address and A2 address, and store this part of information in SFP+SRAM for subsequent use, the specific storage method is shown in FIG. 4A. In addition, as shown in FIGS. 4A and 4B, the memory mappings between SFP+ and QSFP+ are not one-to-one, in order to prevent the missing of some information, EEPROM is added to this part of the design to store customized code-writing information. In the internal program processing of the microcontroller unit, the main work is to convert the information in A0, A2 and EEPROM to conform to the QSFP+ protocol and store it in the A0 address. The specific treatment is as follows:

the module identification information and the manufacturer information in the A0 LOW address of the SFP+SRAM area are divided into two parts, one part includes the module identification information and the manufacturer information, which are converted into information that conforms to the QSFP+ protocol and stored in A0 LOW of the QSFP+SRAM area, the other part includes module identification information, which is converted into information that conforms to the QSFP+ protocol and stored in the 00h address of the A0HIGH of the QSFP+ SRAM area; the module identification information in the A0 HIGH address of the SFP+ SRAM area is converted into information that conforms to the QSFP+ protocol and stored in 00h and 01h of the A0 HIGH of the QSFP+SRAM; the threshold information, the quantity of control signal and the reporting information in the A2 LOW address of the SFP+SRAM area are divided into two parts; one part includes the quantity of control signal and the reporting information, which are converted into information that conforms to the QSFP+ protocol, and stored in A0 LOW of the QSFP+SRAM area, the other part includes threshold information, which is converted into information that conforms to the QSFP+ protocol and stored in the 03h address of the A0 HIGH of the QSFP+SRAM area; the user-defined information in the A2 HIGH address of the SFP+SRAM area is converted to the information that conforms to the QSFP+ protocol and stored in 02h of the A0 HIGH of the QSFP+SRAM; according to the requirements, the customized code-writing information in the EEPROM is stored in the A0 LOW address of the QSFP+SRAM area and the four address spaces of 00h, 01h, 02h and 03h of the A0 HIGH. After dividing the two SRAM areas in the microcontroller unit and loading the corresponding information, the port of the QSFP+ switch will send the read/write command of the A0 address. When the microcontroller unit recognizes this signal, it will point the pointer to the corresponding position in the QSFP+SRAM area for query relevant information and return it to the QSFP+ switch. For the control signal with higher processing timing requirements, the interrupt mode is used here to speed up the response time, and the interrupt response and processing time can fully meet the needs of use under the premise of meeting the protocol requirements.

Figure 5:
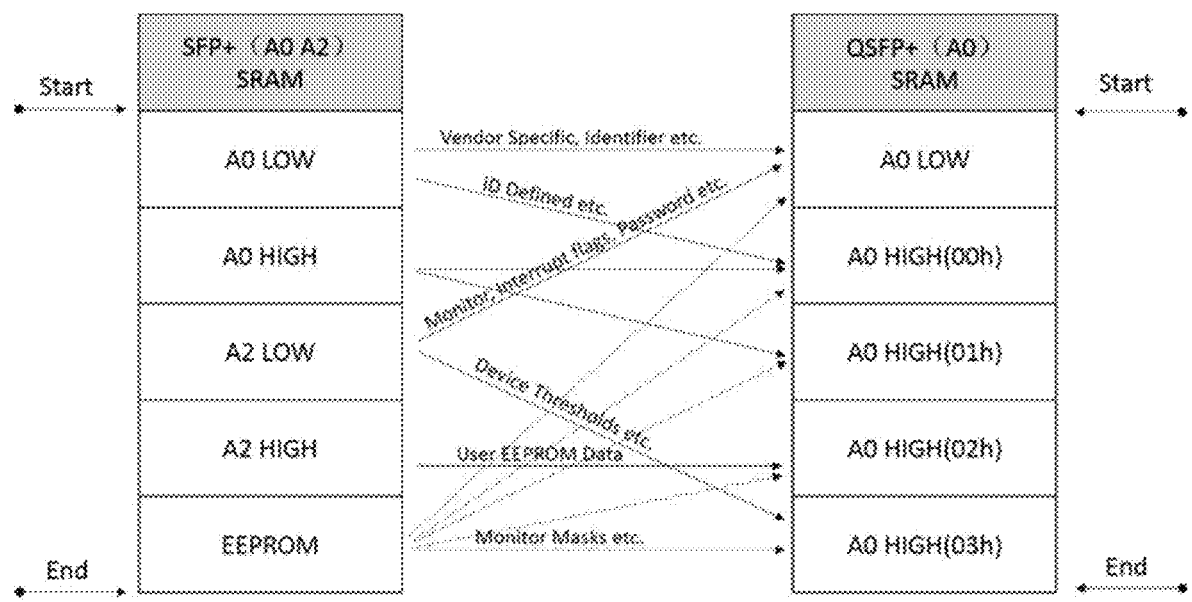
FIG. 5 shows the protocol conversion logic provided by the embodiment of the present invention.
Figure 6:
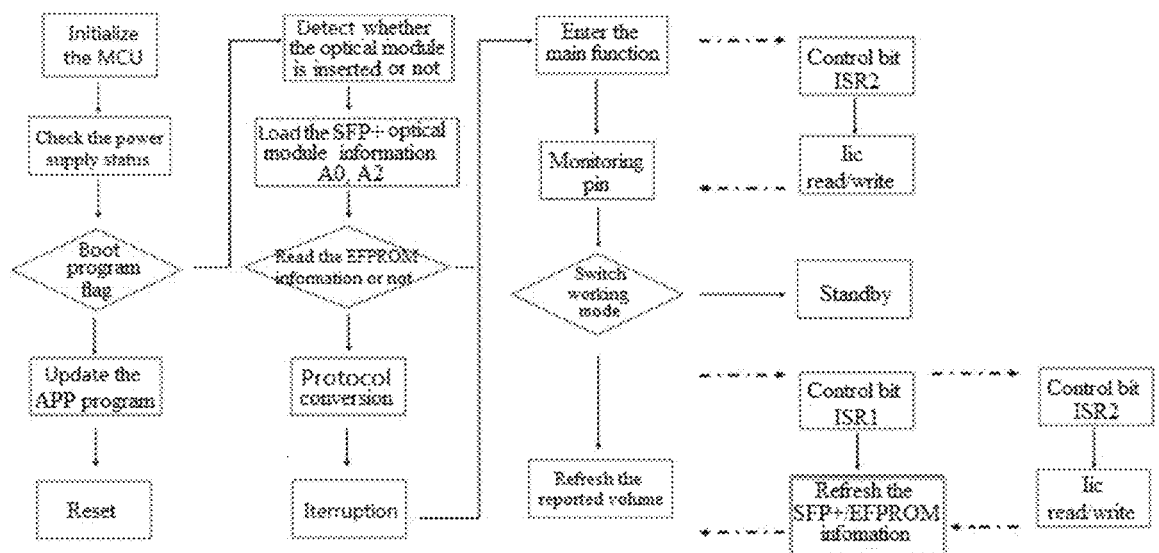
FIG. 6 shows the information processing flow provided by an embodiment of the present invention

FIG. 6 shows the information processing flow of the adapter card, including, online upgrade: after power on, the module first performs initial configuration, and then after the power supply is stable, the boot program flag is retrieved to determine whether to update the APP program or enter the work mode of the adapter. When entering the adapter card mode, it will first detect whether the SFP+ optical module is inserted or not according to the ModePrsL level signal; power-on configuration: the next step is to load the SFP+ optical module information and determine whether to import data from EEPROM, the above information is stored in SFP+ SRAM; the protocol conversion logic as shown in FIG. 5 will be carried out later; main loop: the microcontroller unit will first check the pin status of ModePrsL, confirm whether the microcontroller unit in standby or normal working mode, and polling update the reporting information; after receiving the instruction from the port of the QSFP+ switch, the module enters the interruption and performs control signal processing, and updates the information in the SFP+ optical module; when only the SFP+ optical module is pulled out, the ModePrsL pin signal will be transmitted to the microcontroller unit, after the microcontroller unit recognizes this signal, it will switch the mode and turn off all unnecessary overhead to reduce power consumption. The amount of control signals passed in as shown in FIG. 3 are all use interrupt mode for processing.

The above descriptions are only preferred embodiments of the present invention and not intended to limit the present invention. Any modification, equivalent replacement, improvement, etc. made within the spirit and principle of the present invention shall be included in the protection scope of the present invention.

What is claimed is:

1. A system of interface communication compatible with Small Form-factor Pluggables+ (SFP+) optical modules and Quad Small Form-factor Pluggable+ (QSFP+) switch, comprising: an adapter card, wherein the adapter card comprises a set of SFP+ golden fingers that comply with the SFP+ protocol, a set of QSFP+ golden fingers that comply with the QSFP+ protocol, and a microcontroller unit;

the adapter card communicates with an SFP+ optical module through the SFP+ golden fingers, and communicates with a QSFP+ switch through the QSFP+ golden fingers;

the microcontroller unit is used to extend and process pin information in the adapter card, and to convert two different protocols of SFP+ and QSFP+, so that a module under the SFP+ protocol can respond under a port of QSFP+, so as to realize a data communication between the SFP+ optical module and the QSFP+ switch;

wherein, the microcontroller unit extends and processes the pin information in the adapter card, and converts the two different protocols of SFP+ and QSFP+, so that the module under the SFP+ protocol can respond under the port of QSFP+, comprising: realize software-level memory mapping compatibility and protocol conversion logic in the microcontroller unit;

wherein, realize software-level memory mapping compatibility is specifically as follows: divide two Static Random-Access Memory (SRAM) areas in the microcontroller unit, namely an SFP+SRAM area and a QSFP+SRAM area; the SFP+SRAM area corresponds to the SFP+ optical module, and the QSFP+SRAM area corresponds to the QSFP+ switch; the SFP+SRAM area is allocated with protocol definition storage space A0 and A2, which are used to store various code-writing information and reporting information of the SFP+ optical module, and the QSFP+SRAM area is allocated with protocol definition storage space A0;

the protocol conversion logic is specifically as follows: when the SFP+ optical module is connected with the adapter card, the microcontroller unit reads the various code-writing information and the reporting information of the SFP+ optical module, and stores them in the A0 address and the A2 address of the SFP+SRAM area; in an internal program processing of the microcontroller unit, when the microcontroller unit of the adapter card responds to a read-write command sent by the QSFP+ switch, information in the A0 address and the A2 address of the SFP+SRAM area is converted into information that conforms to the QSFP+ protocol and stored in the A0 address of the QSFP+SRAM area.

2. The system of interface communication compatible with the SFP+ optical modules and the QSFP+ switch according to claim 1, wherein the QSFP+ golden fingers comprise four sets of high-speed signal pins and five sets of control signal pins; the four sets of high-speed signal pins are Tx1/Rx1 pin, Tx2/Rx2 pin, Tx3/Rx3 pin, and Tx4/Rx4 pin; the five sets of control signal pins are ModSelL pin, ResetL pin, LPMode pin, IntL pin and ModePrsL pin;

the SFP+ golden fingers comprise a set of high-speed signal pins and four sets of control signal pins; the set of high-speed signal pins is the Tx1/Rx1 pin, and the four sets of control signal pins are ModePrsL pin, RS0 and RS1 pin, TXDISABLE pin and Loss of Signal (LOS) pin;

the microcontroller unit comprises two Inter-Integrated Circuit buses (IICs), namely I2C_1 and I2C_2; the microcontroller unit communicates with the QSFP switch connected to the QSFP+ golden fingers through I2C_2, and communicates with the SFP optical module connected to the SFP+ golden fingers through the I2C_1 of the SFP+ golden fingers; the microcontroller unit also communicates with a mounted Electrically Erasable Programmable Read Only Memory (EEPROM) through an IIC/Serial Peripheral Interface (SPI) communication mode;

the Tx1/Rx1 pin of the QSFP+ golden fingers is directly connected with the Tx1/Rx1 pin of the SFP+ golden fingers, and the other three high-speed signal pins of the QSFP+ golden fingers are shielded, so that the signals transmitted by the QSFP+ golden fingers are only guaranteed one channel of signal communicates with the module of the SFP+ golden fingers; the ModSelL pin of the QSFP+ golden fingers is connected with the microcontroller unit to detect whether a communication between the QSFP+ golden fingers and the microcontroller unit is established; the ModePrsL pin of the QSFP+ golden fingers and the ModePrsL pin of the SFP+ golden fingers are both connected with the microcontroller unit, used to detect whether the SFP+ optical module connected with the SFP+ golden fingers is inserted; the LPMode pin of the QSFP+ golden fingers is a low-power control pin of the QSFP+ golden fingers, which is directly connected with the microcontroller unit, and is connected with the RS0 and RS1 pin of the SFP+ golden fingers through a level conversion logic, and it shows a function of rate selection at the SFP+ optical module side; the ResetL pin of the QSFP+ golden fingers has a module reset function, it's directly connected with the microcontroller unit, and connected with the TXDISABLE pin of the SFP+ golden fingers through the level conversion logic, and it shows a function of TxDisable pin at the SFP+ optical module side; the IntL pin of the QSFP+ golden fingers has an interrupt output function, it's directly connected with the microcontroller unit, and connected with the Loss Of Signal (LOS) pin of the SFP+ golden fingers through the level conversion logic, and it shows a Loss of Signal (LOS) function at the SFP+ optical module side.

3. The system of interface communication compatible with the SFP+ optical modules and the QSFP+ switch according to claim 1, wherein the A0 address of the SFP+ SRAM area comprises 256 byte spaces, wherein the 0-127 byte spaces are defined as A0 LOW, used to store module identification information and manufacturer information of the SFP+ optical module, and the 128-255 byte spaces are defined as A0 HIGH, used to store the module identification information of the SFP+ optical module;

the A2 address of the SFP+ SRAM area comprises 256 byte spaces, wherein 0-127 byte spaces are defined as A2 LOW, used to store threshold information, a quantity of control signal and reporting information of the SFP+ optical module, 128-255 byte spaces are defined as A2 HIGH, used to store user-defined information of the SFP+ optical module; the A0 address of the QSFP+ SRAM area comprises 256 byte spaces, wherein 0-127 byte spaces are defined as A0 LOW, and 128-255 byte spaces are defined as A0 HIGH, wherein the A0 HIGH comprises four address spaces, namely 00h, 01h, 02h and 03h; convert the information in the A0 and A2 addresses of the SFP+ SRAM area into the information that conforms to the QSFP+ protocol and store it in the A0 address of the SFP+ SRAM area is specifically as follows:

the module identification information and the manufacturer information in the A0 LOW address of the SFP+ SRAM area are divided into two parts, one part comprises the module identification information and the manufacturer information, which are converted into information that conforms to the QSFP+ protocol and stored in A0 LOW of the QSFP+SRAM area, the other part comprises module identification information, which is converted into information that conforms to the QSFP+ protocol and stored in the 00h address of the A0HIGH of the QSFP+ SRAM area;

the module identification information in the A0 HIGH address of the SFP+SRAM area is converted into information that conforms to the QSFP+ protocol and stored in 00h and 01h of the A0 HIGH of the QSFP+SRAM;

the threshold information, the quantity of control signal and the reporting information in the A2 LOW address of the SFP+SRAM area are divided into two parts; one part comprises the quantity of control signal and the reporting information, which are converted into information that conforms to the QSFP+ protocol, and stored in A2 HIGH of the QSFP+SRAM area, the other part comprises the threshold information, which is converted into information that conforms to the QSFP+ protocol and stored in the 03h address of the A0 HIGH of the QSFP+SRAM area;

the user-defined information in the A2 LOW address of the SFP+SRAM area is converted to information that conforms to the QSFP+ protocol and stored in 02h of the A0 HIGH of the QSFP+SRAM.

4. The system of interface communication compatible with the SFP+ optical modules and the QSFP+ switch according to claim 1, wherein
the microcontroller unit is also connected with an EEPROM, and the EEPROM is used to store customized code-writing information of the SFP+ optical module.

5. The system of interface communication compatible with the SFP+ optical modules and the QSFP+ switch according to claim 4, wherein
the protocol conversion logic also comprises: when the SFP+ optical module is connected with the adapter card, the microcontroller unit reads the customized code-writing information of the SFP+ optical module and writes it into the EEPROM, and according to requirements, the customized code-writing information in the EEPROM is stored in the A0 LOW address of the QSFP+SRAM area and the four address spaces of 00h, 01h, 02h and 03h of the A0 HIGH.

6. The system of interface communication compatible with the SFP+ optical modules and the QSFP+ switch according to claim 1, wherein
in order for the QSFP+ switch to correctly identify the SFP+ optical module information, two steps are required, specifically as follows: when the SFP+ optical module is connected with the adapter card, the microcontroller unit reads the identification information of the SFP+ optical module and stores it in the SFP+ SRAM area; when the microcontroller unit of the adapter card responds to the read-write commands sent by the QSFP+ switch, it converts the identification information in the internal SFP+SRAM area into the information that conforms to the QSFP+ protocol and stores it in the A0 address of the SFP+SRAM area, and then, returns it to the QSFP+ switch in accordance with a QSFP+ protocol format, so as to ensure that the SFP+ optical module can be identified by the QSFP+ switch.

7. A method of interface communication compatible with SFP+ optical module and QSFP+ switch, comprising:
Setting an adapter card between the SFP+ optical module and the QSFP+ switch, wherein the adapter card comprises a set of SFP+ golden fingers that comply with the SFP+ protocol, a set of QSFP+ golden fingers that comply with the QSFP+ protocol, and a microcontroller unit; the adapter card communicates with the SFP+ optical module through the SFP+ golden fingers, and communicates with the QSFP+ switch through the QSFP+ golden fingers;

extending and processing the pin information in the adapter card through the microcontroller unit, and converting the two different protocols, SFP+ and QSFP+, so that the module under the SFP+ protocol can respond under a port of QSFP+, so as to realize a data communication between the SFP+ optical module and the QSFP+ switch;

wherein, extending and processing the pin information in the adapter card through the microcontroller unit, and converting the two different protocols of SFP+ and QSFP+, so that the module under the SFP+ protocol can respond under the port of QSFP+, comprising: realize software-level memory mapping compatibility and protocol conversion logic in the microcontroller unit;

wherein, realize memory mapping compatibility is specifically as follows: divide two SRAM areas in the microcontroller unit, namely an SFP+SRAM area and a QSFP+SRAM area, the SFP+SRAM area corresponds to the SFP+ optical module, and the QSFP+ SRAM area corresponds to the QSFP+ switch, the SFP+SRAM area is allocated with protocol definition storage space A0 and A2, which are used to store various code-writing information and reporting information of the SFP+ optical module, and the QSFP+ SRAM area is allocated with protocol definition storage space A0;

the A0 address of the SFP+ SRAM area comprises 256 byte spaces, wherein 0-127 byte spaces are defined as A0 LOW, used to store module identification information and manufacturer information of the SFP+ optical module, and 128-255 byte spaces are defined as A0

HIGH, used to store the module identification information of the SFP+ optical module; the A2 address of the SFP+ SRAM area comprises 256 byte spaces, wherein 0-127 byte spaces are defined as A2 LOW, used to store threshold information, a quantity of control signal and reporting information of the SFP+ optical module, 128-255 byte spaces are defined as A2 HIGH, used to store user-defined information of the SFP+ optical module;

the A0 address of the QSFP+SRAM area comprises 256 byte spaces, wherein 0-127 byte spaces are defined as A0 LOW, and 128-255 byte spaces are defined as A0 HIGH, wherein the A0 HIGH comprises four address spaces, namely 00h, 01h, 02h and 03h;

the protocol conversion logic is specifically as follows: when the SFP+ optical module is connected to the adapter card, the microcontroller unit reads the various code-writing information and the reporting information of the SFP+ optical module, and stores them in the A0 address and the A2 address of the SFP+SRAM area, in an internal program processing of the microcontroller unit, when the microcontroller unit of the adapter card responds to a read-write command sent by the QSFP+ switch, information in the A0 address and the A2 address of the SFP+SRAM area is converted into information conforming to the QSFP+ protocol and stored in the A0 address of the QSFP+SRAM area.

8. The method of interface communication compatible with SFP+ optical module and QSFP+ switch according to claim 7, wherein the microcontroller unit is also connected with an EEPROM, and the EEPROM is used to store customized code writing information of the SFP+ optical module;

the protocol conversion logic also comprises: when the SFP+ optical module is connected to the adapter card, the microcontroller unit reads the customized code-writing information of the SFP+ optical module and writes it into the EEPROM, and according to requirements, the customized code-writing information in the EEPROM is stored in the A0 LOW address of the QSFP+SRAM area and the four address spaces of 00h, 01h, 02h and 03h of the A0 HIGH.

* * * * *